United States Patent
Selvaraj

(10) Patent No.: US 11,462,364 B2
(45) Date of Patent: Oct. 4, 2022

(54) HYBRID FERROELECTRIC DISCOTIC LIQUID CRYSTAL SOLAR CELL

(71) Applicants: Ananda Rama Krishnan Selvaraj, Cuddalore (IN); Shivalingaiah B, Bangalore (IN); Vidyashankar S, Bangalore (IN); Nitte Ramananda Shetty, Bangalore (IN)

(72) Inventor: Ananda Rama Krishnan Selvaraj, Cuddalore (IN)

(73) Assignees: Ananda Rama Krishnan Selvaraj, Cuddalore (IN); Shivalingaiah B, Bangalore (IN); Vidyashankar S, Bangalore (IN); Nitte Ramananda Shetty, Bangalore (IN)

( * ) Notice: Subject to any disclaimer, the term of this patent is extended or adjusted under 35 U.S.C. 154(b) by 35 days.

(21) Appl. No.: 16/337,410

(22) PCT Filed: Nov. 7, 2018

(86) PCT No.: PCT/IB2018/058729
§ 371 (c)(1),
(2) Date: Mar. 28, 2019

(87) PCT Pub. No.: WO2019/229514
PCT Pub. Date: Dec. 5, 2019

(65) Prior Publication Data
US 2021/0074486 A1    Mar. 11, 2021

(30) Foreign Application Priority Data
Jun. 1, 2018  (IN) .............................. 201841020592

(51) Int. Cl.
*H01G 9/20* (2006.01)
*C09K 19/02* (2006.01)
(Continued)

(52) U.S. Cl.
CPC ....... *H01G 9/2004* (2013.01); *C09K 19/0225* (2013.01); *C09K 19/32* (2013.01);
(Continued)

(58) Field of Classification Search
None
See application file for complete search history.

(56) References Cited

U.S. PATENT DOCUMENTS

2009/0056795 A1* 3/2009 Kang ................... H01G 9/2004
                                                          136/252

OTHER PUBLICATIONS

Rama et al., Liquid Crystals, 2015, vol. 42, No. 12, pp. 1815-1822. (Year: 2015).*

* cited by examiner

*Primary Examiner* — Eli S Mekhlin
(74) *Attorney, Agent, or Firm* — Preston Smirman

(57) ABSTRACT

The present invention provides a hybrid ferroelectric discotic liquid crystal solar cell by incorporating an electrolyte composition for improving power conversion efficiency of the solar cell. The hybrid ferroelectric (FE) discotic liquid crystal solar cell comprises a first layer of n-type inorganic semiconductor deposited on conductive fluorine doped tin oxide (FTO) glass plate 101, a second thin layer of light absorbing inorganic sensitizer 103; wherein the inorganic sensitizer strained titania FTO glass-plate acts as a photo anode, a third layer of ferroelectric discotic liquid crystal electrolyte 104 applied between the photo anode and a photo cathode and a fourth layer of reflective platinum deposited FTO glass-plate 105 configured to act as the photo cathode. The ferroelectric discotic liquid crystal electrolyte composition comprises of an achiral HAT6 discotic molecule (2,3,6,7,10,11-Hexakis-hexyloxy triphenylene) and at least two additives, wherein the additives includes tertiary butyl (Continued)

pyridine (t-bPy) and lithium bis(trifluoromethylsulphonyl) imide Li[CF3SO2]2N.

3 Claims, 7 Drawing Sheets

(51) Int. Cl.
    *C09K 19/32*          (2006.01)
    *C09K 19/54*          (2006.01)
    *C09K 19/04*          (2006.01)

(52) U.S. Cl.
    CPC ...... C09K 19/54 (2013.01); *C09K 2019/0429* (2013.01); *C09K 2019/328* (2013.01); *H01G 9/2022* (2013.01); *H01G 9/2031* (2013.01)

300

400

600

HYBRID FERROELECTRIC DISCOTIC LIQUID CRYSTAL SOLAR CELL

FIELD OF INVENTION

The embodiments herein generally relate to photovoltaic diode or solar cells. More particularly, the invention relates to an electrolyte composition incorporated in the solar cell for improving power conversion efficiency of a dye sensitized solar cell.

BACKGROUND AND PRIOR ART

Renewable solar energy is one of the top solution for the increasing future energy demand in earth and astronomical applications. Sun light to electricity, power conversion efficiency (PCE) value and economic considerations of solar cell are the crucial issues in solar cell technology. Presently, there are three different generations of solar cell technologies. The first generation solar cells are crystalline silicon (Si) solar cells, second generation solar cells are thin film amorphous Si solar cells, cadmium telluride (CdTe) solar cells, copper indium gallium selenide (CIGS) solar cells and third generation solar cells are dye sensitized solar cells (DSSCs), quantum dot solar cells (QDSCs), organic p-n bulk hetero junction (BHJ) solar cells, organic tandem solar cells, perovskite solar cells and ferroelectric (FE) solar cells.

Currently, maximum PCE of first generation single crystalline Si solar cell is 26.6%, PCE of second generation copper indium gallium selenide solar cell is 23.3%, PCE of third generation perovskite solar cell is 22.7%, PCE of third generation Quantum dot solar cell is 13.4% and PCE of third generation Dye sensitized solar cell is 11.9% & 14.3%.

The major constraint in solar cells is Shockley-Queisser (SQ) limit. The Shockley-Queisser (SQ) theoretical limit proposed for solar cells with single band gap materials, states that the PCE value cannot exceed more than 33% in single band gap materials based solar cells. Therefore Si or other type of existing single band gap materials or single junction solar cells cannot give PCE value more than SQ limit.

The possible ways to overcome Shockley-Queisser limit are tandem solar cells, ferroelectric (FE) solar cells, formations of hot carriers, multiple exciton generation, multi band solar cells and thermo photovoltaics.

Photovoltaic cell viz., dye sensitized solar cells (DSSC) have optically transparent inorganic semiconductor ($TiO_2$) layer deposited on conductive glass or transparent conductive polymer sheets with a thickness in microns. The next layer is light absorbing ruthenium based sensitizer molecules (or organic sensitizer) with a thickness of few nanometers. Platinum deposited glass or polymer electrode act as a counter electrode (light reflecting layer) and dye deposited $TiO_2$ electrode act as photo anode. The redox electrolyte (iodide/triiodide) medium is applied between working photo anode and counter cathode in DSSCs. Michael Graetzel, et al. [U.S. Pat. No. 4,927,721 (1990) & EP0525070B1 (1995)] proposed a photo-electrochemical cell comprising a polycrystalline metal oxide semiconductor layer having a substantially monomolecular chromophore (dye) layer in a surface zone and achieved a monochromatic efficiency of 12%.

Sunlight to electricity power conversion efficiency (PCE) value of said DSSCs is 11.9% and 14.3%. The comparatively less PCE value than Si solar cells and sealing, stability issues are critical parameters to be addressed in this type of solar cells.

Triphenylene based discotic electrolytes were introduced in DSSCs as iodine free redox medium and achieved 0.45% PCE value in DSSCs. (Ananda Rama Krishnan Selvaraj, et al. LiquidCrystals, 42:12, 1815-1822).

Discotic molecules are able to self-organize as columns and will perform as one dimensional organic semiconductor or organic quantum dots or quantum wire depending on number of monomer units aligned together because of 'π' electron stacking interactions between the aromatic core parts.

In excitation, inorganic sensitizer forms electron-hole pairs and organic sensitizer forms Frenkel exciton (bound state of electron-hole) within solar cells under illumination. Absorption of suitable wavelength photon results separation of electron and hole in inorganic sensitizers and Frenkel exciton needs an additional energy to separate into electron and hole pairs because their band gap is usually higher than optical photon absorption edge.

V.M. Fridkin [V.M. Fridkin, Photoferroelectrics, Springer-Verlag, Berlin (1978)] reported possibility of ferroelectric solar cells with photo ferroelectric crystal. Nechache, et al. (US. Pat. No. US2012/0017976 A1 (2012)) reported ferroelectric (FE) or multiferroic (MF) [(ITO/BFCO/Nb-doped SrTiO3(001)] p-n heterostructure) solar cells with PCE value of 8.1%, open circuit photo voltage of 0.84 V and short circuit photocurrent value of 20.6 mA/cm$^2$. However, the performance of ferroelectric solar cells is less than Si solar cell.

Presently, the performance of ferroelectric or multi ferroelectric solar cells is not competitive with Si solar cells and such solar cells are not able to cross SQ limit. Therefore there is a need to develop a stable ferroelectric or multi ferroelectric solar cell by incorporating an electrolyte composition for attaining improved power conversion efficiency and thereby overcoming SQ limitation.

OBJECTS OF THE INVENTION

Some of the objects of the present disclosure are described herein below:

A main object of the present invention is to provide a lyotropic ferroelectric discotic liquid crystal electrolyte composition for improving power conversion efficiency of a ferroelectric solar cell.

Another object of the present invention is to provide a hybrid ferroelectric discotic liquid crystal solar cell by incorporation of the lyotropic ferroelectric discotic liquid crystal electrolyte in a dye sensitized solar cell structure.

Still another object of the present invention is to provide a lyotropic ferroelectric discotic liquid crystal electrolyte formation from achiral discotic molecules probably by weak bonding.

Yet another object of the present invention is to provide a hybrid ferroelectric discotic liquid crystal solar cell without containing any toxic metal.

Another object of the present invention is to provide a low cost and reliable high power conversion efficient ferroelectric crystal solar cell.

Another object of the present invention is to provide a ferroelectric solar cell capable of overcoming Shockley-Queisser (SQ) limit.

The other objects and advantages of the present invention will be apparent from the following description when read in conjunction with the accompanying drawings, which are incorporated for illustration of preferred embodiments of the present invention and are not intended to limit the scope thereof.

SUMMARY OF THE INVENTION

In view of the foregoing, an embodiment herein provides a stable hybrid ferroelectric discotic liquid crystal solar cell by incorporating an electrolyte composition in dye sensitized solar cell structure for improving power conversion efficiency of the solar cell.

According to an embodiment, the hybrid ferroelectric (FE) discotic liquid crystal solar cell comprising a first layer of n-type inorganic semiconductor deposited on conductive fluorine doped tin oxide (FTO) glass plate; wherein the inorganic n-type semiconductor includes SOLARONIX® titania paste with particle size of 20 nm and nano-crystalline $TiO_2$; a second thin layer of light absorbing inorganic sensitizer deposited above the first layer; wherein the inorganic sensitizer strained titania FTO glass-plate acts as a photo anode; a third layer of ferroelectric discotic liquid crystal electrolyte applied between the photo anode and a photo cathode; and a fourth layer of reflective platinum deposited FTO glass-plate configured to act as the photo cathode.

According to an embodiment, the n-type inorganic semiconductor is deposited on conductive fluorine doped tin oxide (FTO) glass plate by screen printing method.

According to an embodiment, the light absorbing inorganic sensitizer is deposited above the first layer by soaking process.

According to an embodiment, the inorganic sensitizer is N719 [cis-diisothiocyanato-bis (2, 2-bipyridyl-4,4dicarboxylato) ruthenium (II) bis (tetrabutylammonium] sensitizer (acetronitrile and tert-butyl alcohol; 1:1).

According to an embodiment, the ferroelectric discotic liquid crystal electrolyte composition comprises of at least 10 mg of achiral HAT6 discotic molecule (2,3,6,7,10,11-Hexakis-Hexyloxy-Triphenylene) and at least two additives. According to an embodiment, the additives includes at least 0.1 ml of tertiary butyl pyridine (t-bPy) and at least 3 mg of lithium bis(trifluoromethylsulphonyl)imide $Li[CF_3SO_2]_2N$. The ferroelectric discotic liquid crystal electrolyte composition is iodine free and volatile solvent free. The hybrid ferroelectric discotic liquid crystal solar cell produces or attains a power conversion efficiency value of 24.4626% and open circuit photo voltage value of 2.144 V.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF DRAWINGS

The detailed description is set forth with reference to the accompanying figures. In the figures, the left-most digit (s) of a reference number identifies the figure in which the reference number first appears. The use of the same reference numbers in different figures indicates similar or identical items.

DETAILED DESCRIPTION OF THE PREFERRED EMBODIMENTS

Figure 1:
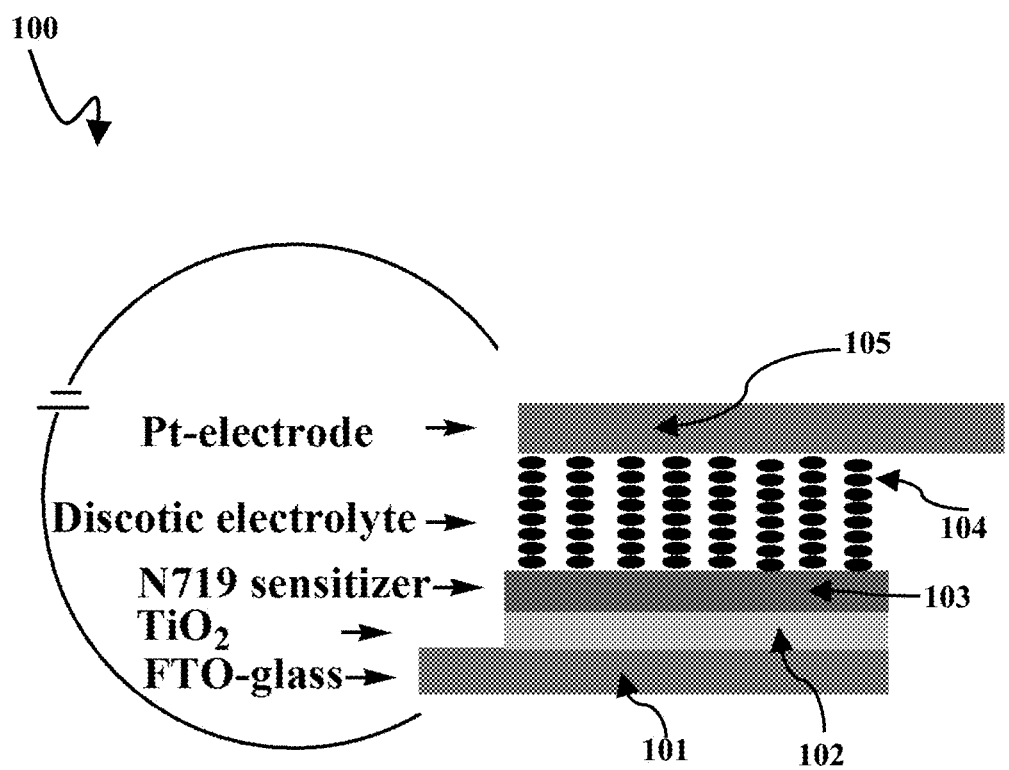
FIG. 1 illustrates a schematic representation of different layers and components of hybrid ferroelectric discotic liquid crystal solar cell, according to an embodiment of the present invention herein.

The embodiments herein and the various features and advantageous details thereof are explained more fully with reference to the non-limiting embodiments and detailed in the following description. Descriptions of well-known components and processing techniques are omitted. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned above, there is a need to develop a stable ferroelectric or multi ferroelectric solar cell by incorporating an electrolyte composition for attaining improved power conversion efficiency and thereby overcoming SQ limitation. The embodiments herein achieve this by providing a stable hybrid ferroelectric discotic liquid crystal solar cell by incorporating an electrolyte composition. Referring now to the drawings, and more particularly to FIG. 1 through FIG. 5, where similar reference characters denote corresponding features consistently throughout the figures, there are shown preferred embodiments.

FIG. 1 illustrates a schematic representation 100 of different layers and components of hybrid ferroelectric discotic liquid crystal solar cell, according to an embodiment of the present invention. According to an embodiment, the hybrid ferroelectric (FE) discotic liquid crystal solar cell comprising a first layer of ntype inorganic semiconductor deposited on conductive fluorine doped tin oxide (FTO) glass plate 101; wherein the inorganic n-type semiconductor includes SOLARONIX® titania Paste with particle size of 20 nm and nano-crystalline $TiO_2$-102; a second thin layer of light absorbing ruthenium based inorganic sensitizer 103 deposited above the first layer; wherein the inorganic sensitizer strained titania FTO glass-plate acts as a photo anode; a third layer of ferroelectric discotic liquid crystal electrolyte 104 applied between the photo anode and a photo cathode; and a fourth layer of reflective platinum deposited FTO glass-plate 105 configured to act as the photo cathode. The FTO glass plate is purchased from SOLARONIX.

According to an embodiment, the n-type inorganic semiconductor is deposited on conductive fluorine doped tin oxide (FTO) glass plate 101 by screen printing method. According to an embodiment, the light absorbing inorganic sensitizer 103 is deposited above the first layer by soaking process. The first layer is baked at 450° C. for 30 minutes and then soaked in 0.0005 M concentration of the light absorbing inorganic sensitizer 103 solution for 18 hours. According to an embodiment, the inorganic sensitizer 103 is N719 [cis-diisothiocyanato-bis(2,2-bipyridyl-4,4dicarboxy-lato)ruthenium(II) bis(tetrabutylammonium] sensitizer (acetonitrile and tert-butyl alcohol; 1:1). The N719 [cis-diiso-thiocyanato-bis(2,2-bipyridyl-4,4dicarboxylato)ruthenium (II) bis(tetrabutylammonium] sensitizer (acetonitrile and tert-butyl alcohol; 1:1) is purchased from SOLARONIX. A SOLARONIX® thermo plastic spacer with 25 micron thickness is used between the photo anode and the photo cathode.

According to an embodiment, the ferroelectric discotic liquid crystal electrolyte 104 composition comprises of at least 10 mg of achiral HAT6 discotic molecule (2, 3, 6, 7, 10, 11-Hexakis-Hexyloxy-Triphenylene) and at least two additives. According to an embodiment, the additives includes at least 0.1 ml of tertiary butyl pyridine (t-bPy) and at least 3 mg of lithium bis(trifluoromethylsulphonyl) imide $Li[CF_3SO_2]_2N$. The ferroelectric discotic liquid crystal electrolyte 104 composition is iodine_free and volatile solvent free.

The achiral HAT6 discotic molecule (2,3,6,7,10,11-Hexa-kis-hexyloxy triphenylene) is purchased from TCI with a purity of 99% and additives tertiary butyl pyridine (t-bPy) and lithium bis(trifluoromethylsulphonyl)imide $Li[CF_3SO_2]_2N$ is purchased from Sigma Aldrich. The ferroelectricity is found in discotic electrolyte in the presence as well as in the absence of lithium bis (trifluoromethylsulphonyl)imide $Li[CF_3SO_2]_2N$ additive.

At the moment, the possible explanation for the ferroelectricity of discotic liquid crystalline electrolyte in the absence of lithium bis(trifluoromethylsulphonyl)imide $Li[CF_3SO_2]_2N$ additive would be non-bonded interaction between HAT6 and t-bPy molecules, probably weak (C—H---N) Hydrogen Bonding (HB). The ferroelectric discotic liquid crystal electrolyte and its incorporation with titania and sensitizer forms a new type of hybrid structure and thereby forms hybrid ferroelectric discotic liquid crystal solar cell.

Figure 2:
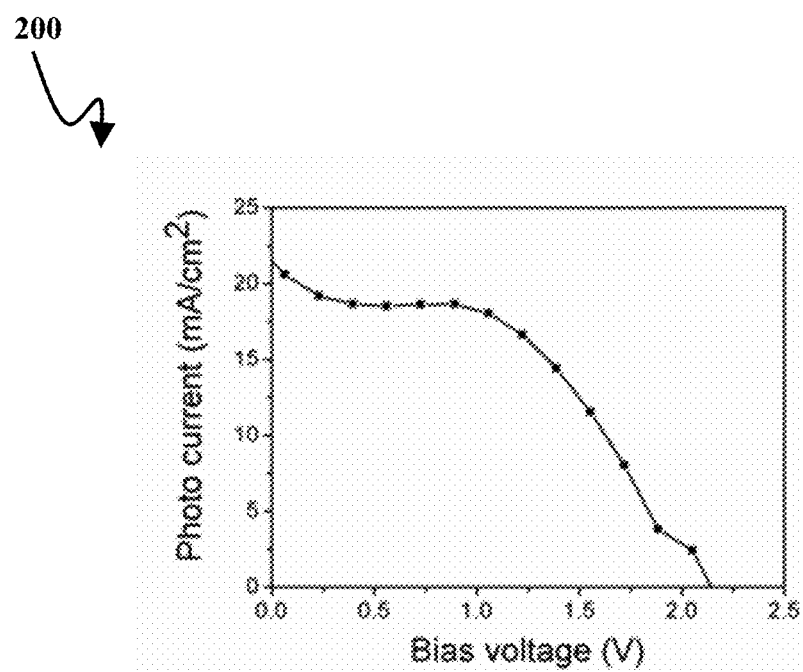
FIG. 2 illustrates a graphical representation of a photo current-photo voltage characterization of the hybrid ferroelectric discotic liquid crystal solar cell under illumination of sunlight, according to an embodiment of the present invention herein.

FIG. 2 illustrates a graphical representation of a photo current-photovoltage characterization of the hybrid ferroelectric discotic liquid crystal solar cell under illumination of sunlight, according to an embodiment of the present invention herein. The performance of the hybrid ferroelectric discotic liquid crystal solar cell is as follows, power conversion efficiency (PCE)=24.4626%, open circuit photo voltage $V_{oc}$=2.144 V, $J_{sc}$=21.5296 mA/cm², fill factor=44.26%. The applied bias voltage during current voltage measurements in the hybrid ferroelectric discotic liquid crystal solar cell is in the range from −0.2 V to 10 V under illumination of sunlight. The bias voltage is used for the effective separation of bound 'Frenkel exciton' into electron and hole.

Figure 5:
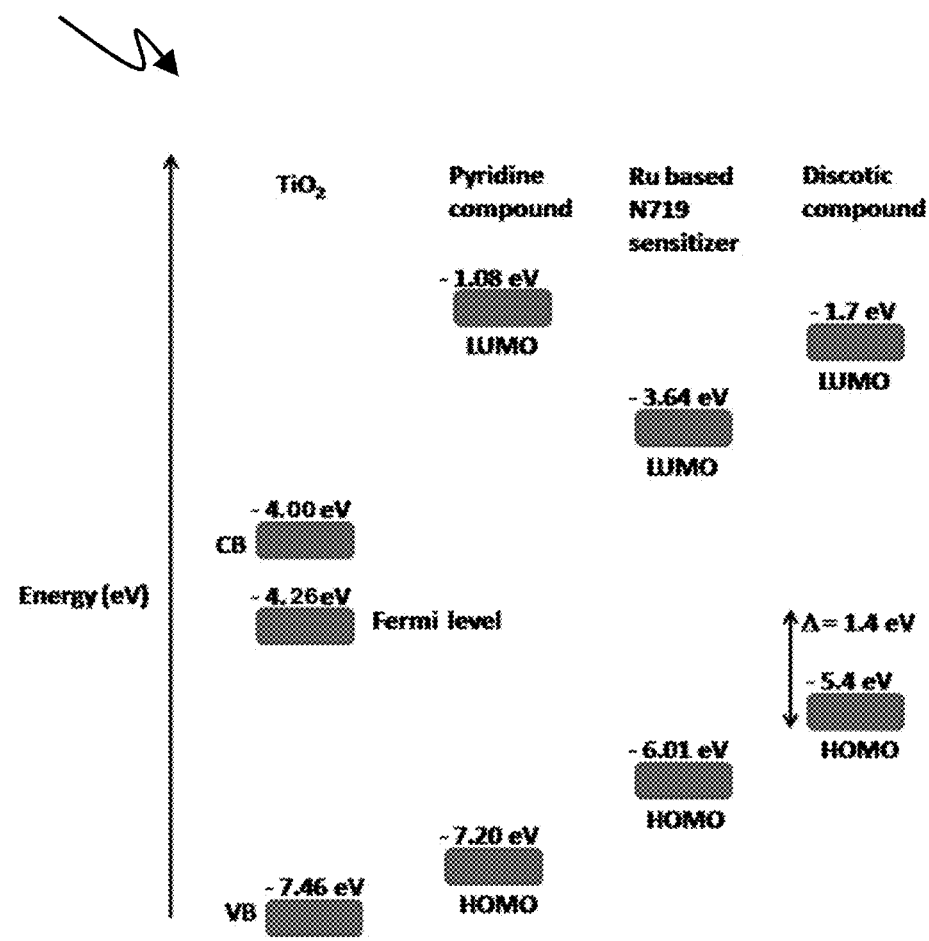
FIG. 5 illustrates a schematic diagram showing band gap energy levels of components of the hybrid ferroelectric discotic liquid crystalline solar cell, according to an embodiment of the present invention herein.

The measured $V_{oc}$ value of solar cell is higher than the electronic band gap difference between HOMO of discotic molecule and Fermi level of inorganic semiconductor (difference is 1.4 eV see FIG. 5). By definition in solar cells, if this solar cell works as a dye sensitized solar cells, its photo voltage (V) cannot be exceeded more than 1.4 eV based on the band gap energy difference between sensitizer, discotic and titania. The obtained 2.144 V photo voltage confirms this type of solar cells is not dye sensitized solar cell. The obtained photo voltage ($V_{oc}$) is higher than band gap difference between discotic and titania therefore, it is a bulk photovoltaic effect with new type of found FE discotic electrolyte in hybrid ferroelectric discotic liquid crystal solar cell.

The high $V_{oc}$ value of solar cell may originate from ferroelectric polarization value of discotic electrolyte or from the formation of energetically stable new ferroelectric complex formation between discotic and inorganic sensitizer, semiconductor within solar cell. The FE nature of found discotic liquid crystal electrolyte is confirmed by dielectric spectroscopic methods.

Figure 3:
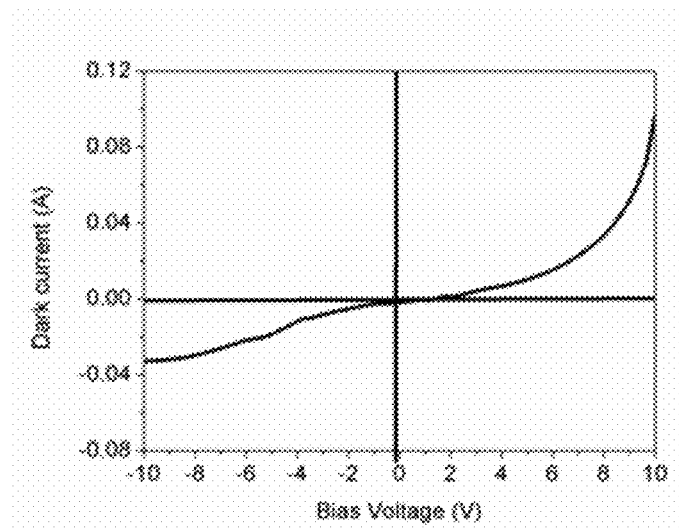
FIG. 3 illustrates a graphical representation of a current-voltage characterization of the hybrid ferroelectric discotic liquid crystal solar cell under dark condition, according to an embodiment of the present invention herein.

FIG. 3 illustrates a graphical representation of a current-voltage characterization of the hybrid ferroelectric discotic liquid crystal solar cell under dark condition, according to an embodiment of the present invention herein. The diode character of the hybrid ferroelectric discotic liquid crystal solar cell is confirmed by current voltage (I-V) characterization under illumination shown in FIG. 2 and current voltage (I-V) characterization under dark condition shown in FIG. 3.

Figure 4:
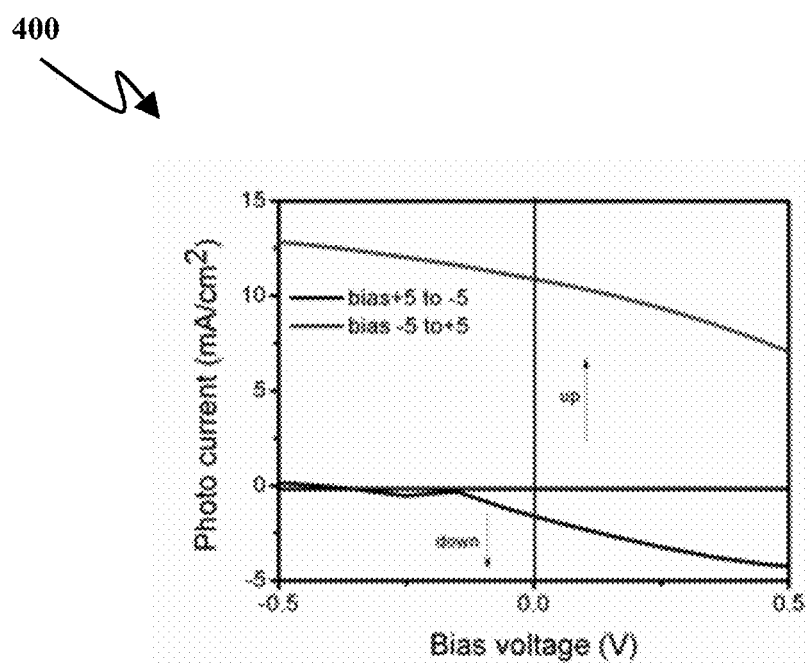
FIG. 4 illustrates a graphical representation of switching in the sign of photo-current value of the hybrid ferroelectric discotic liquid crystal solar cell by changing the sign of applied bias voltage in current-voltage characterization under illumination, according to an embodiment of the present invention herein.

FIG. 4 illustrates a graphical representation of switching in the sign of photo-current value of the hybrid ferroelectric discotic liquid crystal solar cell by changing the sign of applied bias voltage in current-voltage characterization under illumination, according to an embodiment of the present invention herein. The change in sign of the photo current obtained during change in the direction of applied bias voltage direction in solar cells under illumination of light. It confirms the switching of photocurrent in hybrid ferroelectric discotic liquid crystal solar cells.

FIG. 5 illustrates a schematic diagram showing band gap energy levels (vacuum) of components of the hybrid ferroelectric discotic liquid crystalline solar cell, according to an embodiment of the present invention herein. The band gap of titania is 3.2 eV and ruthenium sensitizer is 2.37 eV and discotic is 3.7 eV. The band gap of discotic is higher than other two components. The complete passivation of discotic electrolyte over inorganic semiconductor may develop doping or discotic electrolyte may form a charge transfer excitonic complex with ruthenium sensitizers or titania in the hybrid ferroelectric discotic liquid crystal solar cell. Therefore electronic band gap of individual layers in the hybrid ferroelectric discotic liquid crystal solar cell may differ after the addition of discotic electrolyte in solar cell.

The PCE value of newly found hybrid ferroelectric discotic liquid crystal solar cell is higher than emerging photovoltaics. Further, the obtained $V_{oc}$ value (2.144 V) confirms ferroelectric nature.

The ferroelectric discotic liquid crystal electrolyte 104 is capable of avoiding the nucleation of crystal growth in ferroelectric tunnel junction in solar cells and therefore there is no trap of electron and holes. It may increase the $V_{oc}$ value more than the band gap difference depending on polarization value and it will be a ferroelectric discotic passivation effect.

The other possibility is existence of ferromagnetic ground state (triplet state) in discotic liquid crystal electrolyte and the corresponding switching between singlet and low level triplet states due to multiferroic nature of fused discotic core and the consequence is the formation of multiple exciton generation (MEG) by singlet fission process or ferroelectric discotic electrolyte may perform as a multi band system or it will be a synergic effect.

In other scenario, the high performance of solar cell is influenced by high quantum yield of exciting molecules in solar cell under illumination. The high quantum yield will form through triplet-triplet annihilation up conversion process. The ruthenium complexes (electron acceptor/annihilator) and triphenylenes (electron donor) cores are more prone to two photon absorption and such molecules can form high frequency of low energy photons through triplet-triplet annihilation up conversion process (anti-stoke lines). It would increase the form high quantum yield in this type solar cell and subsequently it may alter Incident Photon to Charge conversion Efficiency (IPCE) value of solar cell. Triplet-triplet annihilation is possible when the triplet energy levels of ruthenium sensitizer and discotics are suitable for transfer of electron from donor to acceptor. The other possible scenario would be new particles such as 'Hermann Weyl' particle (half electron) for the unusual charge conduction obtained in the hybrid structure of the solar cell.

Figure 6:
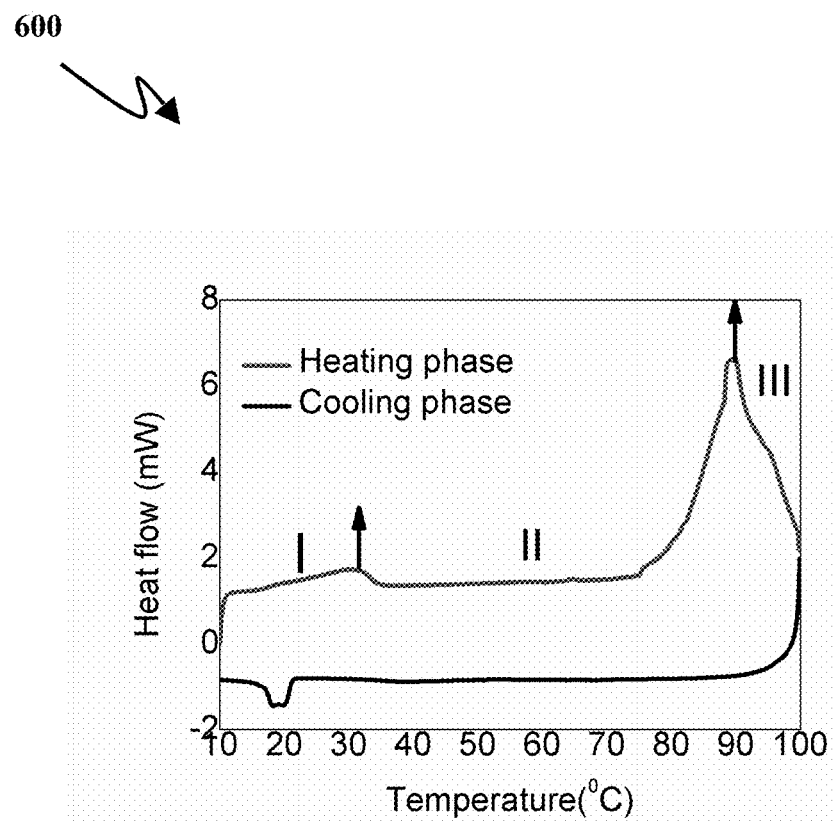
FIG. 6 illustrates a differential scanning calorimetry (DSC) thermogram of applied ferroelectric discotic electrolyte with $Li[CF_3SO_2]_2N$ additive (I: phase I; II: phase II; III: phase III), according to an embodiment of the present invention herein.
Figure 7:
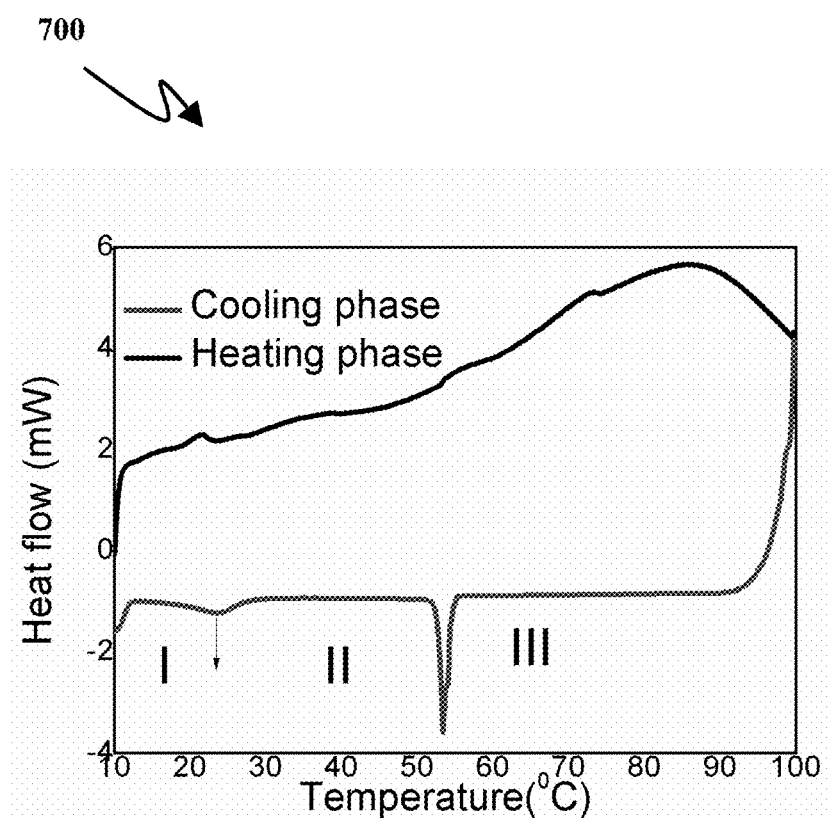
FIG. 7 illustrates a differential scanning calorimetry (DSC) thermogram of ferroelectric discotic electrolyte without $Li[CF_3SO_2]_2N$ additive (I: phase I; II: phase II; III: phase III), according to an embodiment of the present invention herein.

FIG. 6 illustrates a differential scanning calorimetry (DSC) thermogram of applied ferroelectric discotic electrolyte with $Li[CF_3SO_2]_2N$ additive (I: phase I; II: phase II; III: phase III), according to an embodiment of the present invention herein; and FIG. 7 illustrates a differential scanning calorimetry (DSC) thermogram of ferroelectric discotic electrolyte without $Li[CF_3SO_2]_2N$ additive (I: phase I; II: phase II; III: phase III), according to an embodiment of the present invention herein.

A main advantage of the present invention is that a lyotropic ferroelectric discotic liquid crystal electrolyte composition is provided for improving power conversion efficiency of the solar cell.

Another advantage of the present invention is that a hybrid ferroelectric discotic liquid crystal solar cell is provided by incorporation of the lyotropic ferroelectric discotic liquid crystal electrolyte in a dye sensitized solar cell structure.

Still another advantage of the present invention is that a hybrid ferroelectric discotic liquid crystal solar cell is provided without containing any toxic metal Yet another advantage of the present invention is that a low cost and reliable highly power conversion efficient ferroelectric crystal solar cell is provided.

Another advantage of the present invention is that the provided ferroelectric solar cell is capable to overcome Shockley-Queisser (SQ) limit.

Another advantage of the present invention is that particular composition of the electrolyte has other application that includes but not limited to nonlinear optics (NLO) application and optoelectronics.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

I claim:

1. A lyotropic ferroelectric discotic liquid crystal electrolyte composition for improving power conversion efficiency of ferroelectric solar cells, wherein the composition consists of achiral HAT6 (2,3,6,7,10,11-hexakis-hexyloxy-triphenylene) discotic molecules, tertiary-butyl pyridine (t-bPy) and Bis(trifluoromethane)sulphonimide lithium (Li[$CF_3SO_2$]$_2$N).

2. The composition as claimed in claim 1, wherein the composition consists of 10 mg of an achiral HAT6 (2,3,6,7,10,11-hexakis-hexyloxytriphenylene) discotic molecules and 3 mg of Bis(trifluoromethane)sulphonimide lithium (Li[$CF_3SO_2$]$_2$N) in 0.1 ml of tertiary-butyl pyridine (t-bPy).

3. "A hybrid ferroelectric discotic liquid crystal (HFLC) solar cell" comprising:
   a first layer of n-type inorganic semiconductor deposited on conductive fluorine doped tin oxide (FTO) glass:
   wherein the inorganic n-type semiconductor includes nano-crystalline $TiO_2$ with particle size of 20 nm and a thin layer thickness of 10 μm;
   a second thin layer of light absorbing inorganic sensitizer deposited above the first layer;
   wherein the titania FTO glass is soaked in the inorganic sensitizer and acts as a photo anode;
   a third layer consisting of the lyotropic ferroelectric discotic liquid crystal electrolyte of claim 1; and
   a fourth layer of reflective platinum deposited FTO glass configured to act as a photo cathode.

* * * * *